(No Model.)  2 Sheets—Sheet 1.
W. D. EWART.
CLUTCH.
No. 272,947. Patented Feb. 27, 1883.
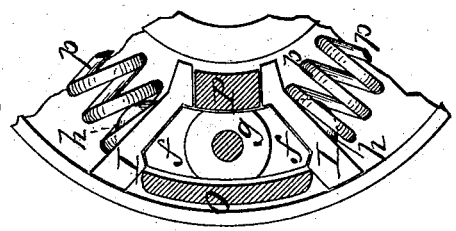
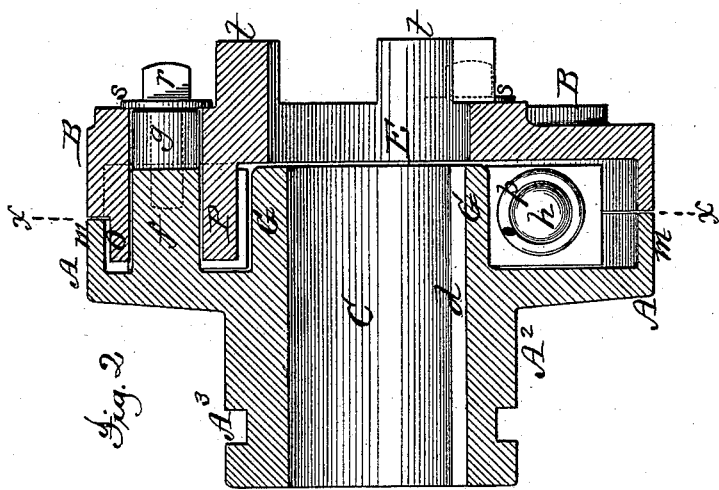
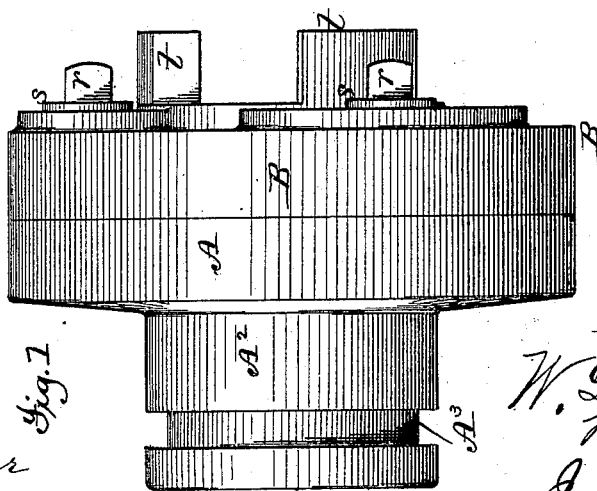
Attest:
Geo. H. Graham
H. C. Janvier
Inventor
W. D. Ewart
by atty.
J. N. McIntire
Att'y.

(No Model.) 2 Sheets—Sheet 2.
W. D. EWART.
CLUTCH.
No. 272,947. Patented Feb. 27, 1883.
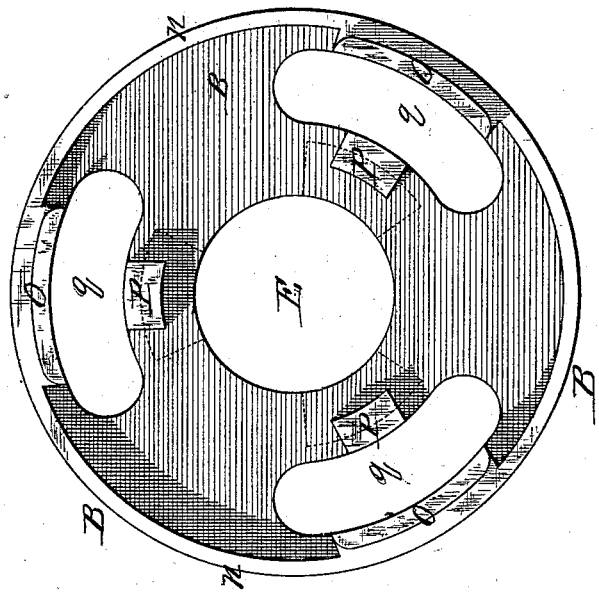
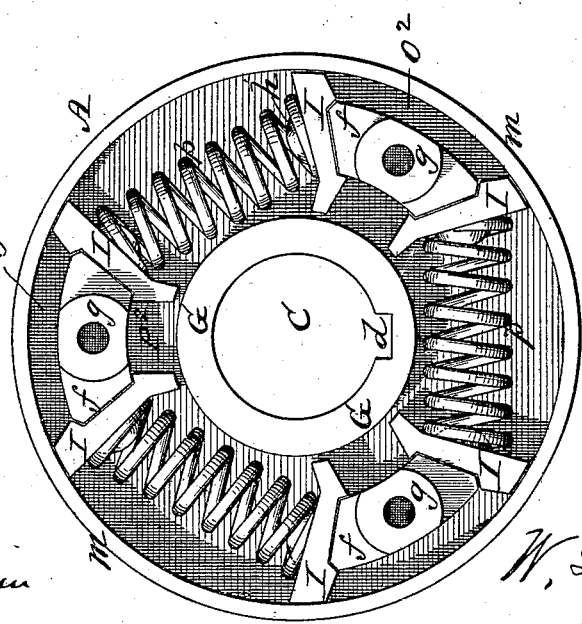
Attest:
Geo. H. Graham
H. C. Janner
Inventor,
W. D. Ewart
By atty
J. N. McIntire
Att'y.

UNITED STATES PATENT OFFICE.

WILLIAM D. EWART, OF CHICAGO, ILLINOIS, ASSIGNOR TO THE LINK-BELT MACHINERY COMPANY, OF SAME PLACE.

CLUTCH.

SPECIFICATION forming part of Letters Patent No. 272,947, dated February 27, 1883.

Application filed December 27, 1882. (No model.)

*To all whom it may concern:*

Be it known that I, WILLIAM DANA EWART, of Chicago, in the county of Cook and State of Illinois, have invented certain new and useful Improvements in Clutches; and I do hereby declare that the following is a full, clear, and exact description thereof, reference being had to the accompanying drawings, making part of this application.
My invention relates to certain new and useful improvements in clutches or clutch devices—such as used, for instance, on lines of shafting for the purpose of throwing into and out of gear with the shafting pulleys or wheels loosely mounted thereon; and it has for its main object to provide for use a device for such purposes so constructed and operated that when the wheel, pulley, or other device loosely mounted on the shaft shall be thrown into engagement with the latter through the medium of the clutch the inertia of the parts to be moved by the rotating clutch and shafting shall be gradually overcome, so as not to create any sudden strain or shock on either the clutch device, its shaft, or the device or means by which said shafting may be driven.

As heretofore constructed, so far as my knowledge goes, all sorts of clutches or clutch devices have embodied in practical operation the objection that when they should be thrown into engagement with any part to be suddenly rotated both the clutch and the shafting and the driving bands or belt for operating said shafting would be subjected to a sudden and severe strain, the shock being in proportion always to the velocity of the continually-moving parts and the amount of power necessary to start into motion the parts to be suddenly driven; and this objection is of more serious account in all cases where metallic belts or drive-chains are used as the medium for imparting power and motion to machinery, because of the incapacity of such driving devices to slip on the peripheries of the wheels in conjunction with which they are generally used. I propose by my invention to overcome this serious difficulty in the use of all clutch devices as heretofore constructed, and thus not only prevent the strain to which some parts are always subjected, but also avoid the disastrous effect to which some of the parts are usually subjected in all cases where drive-chains or any other driving devices are employed which involve a positive interlocking or engagement of the driving-bands and their wheels.

To this main end and object my invention consists, primarily, in making the clutch device in two parts, one of which is splined onto the shaft, and the other of which is free to turn on said shaft, and, while coupled to the first-named part of the clutch, has a rotatory movement or capacity for movement (to a limited extent) independently of the first-named part; and my invention consists, secondarily, in having the parts of such duplex-clutch device so combined and arranged that the part which is free to turn on the shaft may be rotated to a limited extent independently of the other part in either direction, all as will be hereinafter more fully described.

To enable those skilled in the art to which my invention relates to make and use the same, I will now proceed to describe more fully the construction and operation of a clutch device involving my improvements, referring by letters of reference to the accompanying drawings, which make part of this specification, and in which I have illustrated a clutch device embracing both features of my said invention.

In the drawings, Figure 1 is a side elevation of a clutch device made according to my invention. Fig. 2 is a longitudinal central section of the same. Fig. 3 is a partial cross-section at the line $x$ $x$, Fig. 2. Fig. 4 is a face view of the main portion of the clutch, with its other portion removed. Fig. 5 is a similar view of that portion of the clutch which is omitted from Fig. 4.

In the several figures the same part will be always found designated by the same letter of reference.

A represents the body portion of the main part of the clutch device, which is formed, as shown, with a hub-like extension, $A^2$, in the interior of which is turned a groove, $A^3$, for the usual shipper device employed for moving clutches endwise upon their shafts, and this main portion of the clutch has an axial cylindrical opening, as seen at C, adapted to fit the shaft or shafting on which the clutch is to be used, and which hole is provided with a groove, d, adapted to receive a feather, by which said main portion of clutch is to be confined circumferentially on the shaft while allowed to move endwise on the latter. This main portion of the clutch is formed, as shown, with the central hub-like flange, G, and a shorter peripheral flange, m, so that there shall be a sort of annular recess or depressed portion between these flange-like parts G and m, (see Fig. 4,) and within this sort of annular recess are several (preferably three) stud-like projections, each composed of an oblong body portion, f, and a nearly-cylindrical projection or teat-like extension, g, the said body portions f projecting so as to have their outermost faces come about in a plane with the outermost end of the flange-like device G, while the teat-like extensions g project a farther distance, about equal to the thickness of the body portion of the other part, B, of the clutch device. This other part, B, of the clutch device is formed with a sort of peripheral flange, n, (see Fig. 5,) and with three rib-like projections, O O O, and also with three lug-like projections, P P P, between which two sets of projections the body portion of the part B is removed, (for the sake of lightening the casting,) as seen at q q q, and the central bore or hole of this part B of the clutch device is made of a diameter considerably larger than that of the shaft on which the part A is splined, as seen at E. The part B is formed or provided with several projecting lugs, (preferably three,) as seen at t, which are designed to engage in the usual manner with the projecting lugs of the wheel, pulley, or other device with which the clutch is designed to be thrown into engagement at pleasure.

The relative sizes and proportions of the several parts alluded to of the two clutch portions A and B are such that when these two portions shall be placed in proper juxtaposition, as seen at Figs. 1 and 2, the rib-like projections O of the part B will come intermediate of the interior surface of the flange m and the exterior surfaces of the stud like devices f and g, and such that the lug-like projections P of the piece B shall come intermediate of the exterior of the central flange, G, and the inner surface of the devices f g of the part A, all as plainly illustrated, and the retention of the parts A and B together in an endwise direction is effected by means of three bolts, r, which are provided with washers s. They rest on the outer surface of the piece B, the threads of said bolts r engaging with female threads tapped into the devices f g, and the said washers s bearing upon the outer surface of the piece P at the opposite sides of each of the curved openings or slots q.

By the construction and arrangement together of the parts A and B, as shown and described, it will be seen that these two parts, when properly coupled together endwise by the bolts r, as just explained, will be capable of a certain amount of motion relatively in a circumferential direction; and it will be observed that since the part A is designed to be splined onto the shaft or shafting, and since the other part, B, has a central hole considerably larger than the shaft, said part B (which carries the clutching-lugs t) will be capable of a certain extent of motion, or of a partial rotation in either direction about the axis of the shaft. Now, this capacity of the part B relatively to the part A is controlled and utilized in the following manner for the following purpose, to wit: On each side of each of the devices f is arranged, without being fastened thereto, a sort of shoe-piece, I, formed or provided with a slight convex projection, h, and between these devices I are arranged at three places, as clearly shown at Fig. 4, three strong spiral springs, p, each of which is held in place laterally by the projection into its ends of the convex extensions h of the two shoe-pieces I, between which said spring p is arranged. The width of each of the shoe-pieces I is about equal to the length of the centrally-projecting flange G of the main part A of the clutch, while the length of each said shoe-pieces is about equal to the distance between the exterior of said flange G and the interior surface of the flange m, and hence these two pieces I are held properly in place in one direction by being confined between the bottom of the annular recess of the piece A and the inner face of the body portion of casting B, and in the other direction by the exterior surface of flange G and the interior face of flange m, while at the same time either or both of any pair of these shoe-pieces I, combined with either one of the springs p, may be moved bodily within the annular recess of the part A in the event of any compression of the spring p.

By reference now to Fig. 3, it will be clearly seen that each one of the rib-like projections O of the part B of the clutch bears at each end against one of the shoe-pieces I, and that each one of the lugs P of said portion B in like manner bears at each end against one of said shoe-pieces, from which arrangement it follows that if the piece B, with its projecting devices O and P, be moved in one direction or the other circumferentially and relatively to the part A these projecting devices O and P will operate against one or the other of the shoes I, against which they press, and will operate to move one or the other of said shoe-pieces bodily along within the annular recess of the part A of the clutch. Any such movement will of course necessitate the compression, to a greater or less extent, of the spring p, and hence when the part B of the clutch device (while both parts of the clutch are revolving with the shaft to which one of them is splined) shall have its clutch projections t brought into sudden engagement with the projections of the wheel or pulley or other device to be started suddenly into operation the effect will be to cause the part B to partially cease its motion, (to a greater or less extent,) while the part A continues to rotate, such change in the relationship of the parts A and B operating to effect the compression of the spring $p$, and thus is effected a gradual, instead of a sudden, overcoming of the inertia of the pulley, wheel, or other device thrown into engagement with the clutch. Of course whenever the parts of machinery suddenly set in motion shall have gotten fairly started the strong spiral springs $p$ will partially or wholly resume their normal condition, and all the parts of the duplex-clutch device will resume the relative positions seen at Fig. 4, all the parts acting with an elastic pressure. The shoe-pieces I, it will be seen, have depressions or recesses at one side, into which fit the side or end portions of the stud-like device $f$, so that when returned to or permitted to resume their normal positions, after having been forced out of contact with said devices $f$, each of said shoe-pieces I will be held by the spring-pressure in proper juxtaposition with said stud-like device.

From what has already been said it will be understood that in the use of a clutch such as shown and described, whenever the lugs $t$ are thrown into sudden engagement with the clutch-lugs of the device to be started, said device will be started with an elastic force, and hence not only the rapidly-moving devices and those to be suddenly started into motion, but also the driving belts or chains of the shafting, will be relieved of the sudden shock and strain to which all such parts have heretofore been subjected; and it will also be seen that this desirable mode of operation in the use of my improved clutch always follows, irrespective of whether the clutch and shafting may be revolving in one or the other direction.

Of course the details of construction and sizes and proportions of the parts may all be somewhat varied from what I have shown and described without departing from the principle of my invention, and, where deemed expedient, the contrivance may be made with a capacity to operate only in one direction of motion of the shafting.

Having so fully described the construction and operation of my improved clutch device as to enable any one skilled in the art to carry out my invention, what I claim as new, and desire to secure by Letters Patent, is—

1. A clutch device composed of two parts coupled together endwise, but capable of movement relatively in a circumferential direction, and provided with means by which the two parts are held in their normal condition, and by which the clutch is rendered capable of a yielding or elastic engagement with the device with which it may be clutched, substantially as and for the purposes set forth.

2. In combination with the two parts of the duplex clutch, means for rendering the parts capable of a yielding action in either direction of rotation of the shaft to which the main portion of the clutch is splined, all substantially as set forth.

In witness whereof I have hereunto set my hand and affixed my seal this 18th day of December, 1882.

WILLIAM D. EWART. [L. S.]

In presence of—
  EDWD. G. EWART,
  E. N. LARNER.